(12) United States Patent
Cao et al.

(10) Patent No.: US 10,970,514 B2
(45) Date of Patent: Apr. 6, 2021

(54) COMPENSATION STRUCTURE AND DRIVING METHOD THEREOF, DISPLAY PANEL, AND DISPLAY DEVICE

(71) Applicant: BOE TECHNOLOGY GROUP CO., LTD., Beijing (CN)

(72) Inventors: Xueyou Cao, Beijing (CN); Haisheng Wang, Beijing (CN); Xiaoliang Ding, Beijing (CN); Chih Jen Cheng, Beijing (CN); Yanling Han, Beijing (CN); Wei Liu, Beijing (CN); Pengpeng Wang, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/637,025

(22) PCT Filed: May 24, 2019

(86) PCT No.: PCT/CN2019/088403
§ 371 (c)(1),
(2) Date: Feb. 6, 2020

(87) PCT Pub. No.: WO2019/228279
PCT Pub. Date: Dec. 5, 2019

(65) Prior Publication Data
US 2020/0242321 A1 Jul. 30, 2020

(30) Foreign Application Priority Data

May 29, 2018 (CN) .......................... 201810533968.9

(51) Int. Cl.
*G09G 5/00* (2006.01)
*G06F 3/041* (2006.01)
(Continued)

(52) U.S. Cl.
CPC ............. *G06K 9/0004* (2013.01); *G09G 5/10* (2013.01); *G09G 2354/00* (2013.01)

(58) Field of Classification Search
CPC ...... G06K 9/0004; G06F 3/0412; G06F 21/32
See application file for complete search history.

(56) References Cited

U.S. PATENT DOCUMENTS

2003/0147550 A1* 8/2003 Shigeta ................ G06K 9/2027
382/124
2009/0226052 A1* 9/2009 Fedele ................. G06K 9/0008
382/125

(Continued)

FOREIGN PATENT DOCUMENTS

| CN | 106156763 A | 11/2016 |
|----|-------------|---------|
| CN | 106326845 A | 1/2017 |

(Continued)

OTHER PUBLICATIONS

International Search Report of PCT/CN2019/088403 in Chinese, dated Aug. 14, 2019, with English translation.

(Continued)

*Primary Examiner* — Nan-Ying Yang
(74) *Attorney, Agent, or Firm* — Collard & Roe, P.C.

(57) ABSTRACT

Provided are a compensation structure and a driving method thereof, a display panel, and a display device. The compensation structure includes a photoelectric sensing circuit, a fingerprint recognition circuit and a compensation circuit. The photoelectric sensing circuit is configured to respectively generate a first electric signal and a second electric signal according to received first optical signal and second optical signal. The fingerprint recognition circuit is configured to be connected to the photoelectric sensing circuit to receive the first electric signal, and to employ the first electric signal to determine a fingerprint pattern. The compensation circuit is configured to be connected to the pho- (Continued)

toelectric sensing circuit to receive the second electric signal, and to employ the second electric signal to perform optical compensation so as to adjust the first electric signal.

11 Claims, 4 Drawing Sheets

(51) Int. Cl.
  *G06K 9/00* (2006.01)
  *G09G 5/10* (2006.01)

(56) References Cited

U.S. PATENT DOCUMENTS

| | | |
|---|---|---|
| 2017/0061188 A1 | 3/2017 | Kremin et al. |
| 2017/0262682 A1* | 9/2017 | He .......................... G06K 19/07 |
| 2018/0239943 A1 | 8/2018 | Xu et al. |

FOREIGN PATENT DOCUMENTS

| | | |
|---|---|---|
| CN | 107295195 A | 10/2017 |
| CN | 107563317 A | 1/2018 |
| CN | 107563361 A | 1/2018 |
| CN | 108052898 A | 5/2018 |
| CN | 108062540 A | 5/2018 |
| CN | 108735175 A | 11/2018 |
| JP | 2004-206395 A | 7/2004 |
| WO | 2019/114511 A1 | 6/2019 |

OTHER PUBLICATIONS

Chinese Office Action in Chinese Application No. 201810533968.9, dated Sep. 18, 2019 with English translation.

* cited by examiner

FIG. 4 generating, by the photoelectric sensing circuit, the first electrical signal and the second electrical signal according to the first optical signal and the second optical signal respectively — S1 receiving, by the fingerprint identification circuit, the first electrical signal and utilizing the first electrical signal to determine a fingerprint pattern — S2

Receiving, by the compensation circuit, the second electrical signal and utilizing the second electrical signal for optical compensation, so as to adjust the first electrical signal — S3

COMPENSATION STRUCTURE AND DRIVING METHOD THEREOF, DISPLAY PANEL, AND DISPLAY DEVICE

CROSS REFERENCE TO RELATED APPLICATIONS

This application is the National Stage of PCT/CN2019/088403 filed on May 24, 2019, which claims priority under 35 U.S.C. § 119 of Chinese Application No. 201810533968.9 filed on May 29, 2018, the disclosure of which is incorporated by reference.

TECHNICAL FIELD

The embodiments of the present disclosure relate to a compensation structure and a driving method thereof, a display panel and a display device.

BACKGROUND

A current display panel may have a problem of nonuniform luminance, which not only affects a display effect of the display panel, but also influences an accuracy of a fingerprint identification circuit which identifies a fingerprint image based on an optical signal in the display panel.

SUMMARY

Embodiments of the present disclosure provide a compensation structure, comprising a photoelectric sensing circuit, a fingerprint identification circuit and a compensation circuit. The photoelectric sensing circuit is configured to generate a first electrical signal and a second electrical signal respectively according to a first optical signal and a second optical signal which have been received by the photoelectric sensing circuit. The fingerprint identification circuit is configured to be connected to the photoelectric sensing circuit to receive the first electrical signal, and to utilize the first electrical signal for determining a fingerprint image. The compensation circuit is configured to be connected to the photoelectric sensing circuit to receive the second electrical signal, and to utilize the second electrical signal for optical compensation, such that the first electrical signal is adjusted.

In some examples, the first and second optical signals both come from a light-emitting element, and the compensation circuit is configured to utilize the second electrical signal to adjust a driving signal of the light-emitting element, so as to adjust the first electrical signal.

In some examples, the first electrical signal is generated based on the first optical signal and a first time period, and the fingerprint identification circuit is further configured to utilize the adjusted first electrical signal for adjusting a gain of the first electrical signal and/or the first time period.

In some examples, the fingerprint identification circuit comprises: a first switch circuit, connected to the photoelectric sensing circuit and configured to output the first electrical signal to a first node in response to a first control signal; a follower circuit, connected to the first node and configured to output a voltage of the first node to the second node; and a second switch circuit, respectively connected to a reset signal terminal and the first switch circuit, and configured to write a reset voltage from the reset signal terminal to the first node in response to a second control signal.

In some examples, the first switch circuit comprises a first transistor, a gate electrode of the first transistor is configured to receive the first control signal, and a first electrode and a second electrode of the first transistor are connected to the photoelectric sensing circuit and the first node respectively; the follower circuit comprises a second transistor, a gate electrode of the second transistor is connected to the first node, a first electrode and a second electrode of the second transistor are connected to a first power voltage terminal and the second node respectively; the second switch circuit comprises a third transistor, a gate electrode of the third transistor is configured to receive the second control signal, and a first electrode and a second electrode of the third transistor are connected to the reset voltage terminal and the first node respectively.

In some examples, the compensation circuit comprises: a third switch circuit, connected to the photoelectric sensing circuit, and configured to output the second electrical signal to a third node in response to a third control signal.

In some examples, the third switch circuit comprises a fourth transistor, a gate of the fourth transistor is configured to receive the third control signal, and a first electrode and a second electrode of the fourth transistor are connected to the photoelectric sensing circuit and the third node respectively.

Embodiments of the present disclosure further provide a display panel, comprising the above compensation structure and a light-emitting element, and the first and second optical signals both from the light-emitting element.

In some examples, the display panel comprises a first compensation structure, a second compensation structure, a first control line and a second control line. In a case where the fingerprint identification circuit comprises a first switch circuit and the compensation circuit comprises a third switch circuit, the first control line is connected to and control the first switch circuit of the first compensation structure and the third switch circuit of the second compensation structure respectively; the second control line is connected to and control the third switch circuit of the first compensation structure and the first switch circuit of the second compensation structure respectively.

In some examples, the display panel comprises a first compensation structure located in a first region and a second compensation structure located in a second region, and a first switch signal terminal and a second switch signal terminal. In a case where the fingerprint identification circuit comprises a first switch circuit, the compensation circuit comprises a third switch circuit, and the first switch circuit comprises a first transistor and the third switch circuit comprises a fourth transistor, the first switch signal terminal is connected to a gate electrode of the first transistor in the first region and a gate electrode of the fourth transistor in the second region; the second switch signal terminal is connected to a gate electrode of the fourth transistor in the first region and a gate electrode of the first transistor in the second region.

In some examples, the display panel further comprises a pressure sensing circuit. The first switch signal terminal is configured to output a signal to turn on the first transistor in the first region and the fourth transistor in the second region in a case where the pressure sensing circuit senses that the first region is under pressure but the second region is not under pressure. The second switch signal terminal is configured to output a signal to turn on the fourth transistor in the first region and the first transistor in the second region in a case where the pressure sensing circuit senses that the second region is under pressure but the first region is not under pressure.

In some examples, in a case where the first electrical signal is generated according to the first optical signal and a first time period, the compensation circuit is configured to adjust a luminance of the light-emitting element according to the second optical signal, and to adjust a first gain of the first electrical signal and/or the first time period according to the second electrical signal within time of one frame; or the compensation circuit adjusts the luminance of the light-emitting element according to the second optical signal, and to adjust the first gain of the first electrical signal and/or the first time period according to the second electrical signal within time of different frames.

Embodiments of the present disclosure further provide a display device, comprising the above display panel.

Embodiments of the present disclosure further provide a driving method of the above compensation structure, comprising: generating, by the photoelectric sensing circuit, the first electrical signal and the second electrical signal according to the first optical signal and the second optical signal respectively; receiving, by the fingerprint identification circuit, the first electrical signal and utilizing the first electrical signal for determining a fingerprint image; and receiving, by the compensation circuit, the second electrical signal and utilizing the second electrical signal for optical compensation, so as to adjust the first electrical signal.

In some examples, the first and second optical signals both come from a light-emitting element. The receiving, by the compensation circuit, the second electrical signal and utilizing the second electrical signal for optical compensation, so as to adjust the first electrical signal comprises: utilizing, by the compensation circuit, the second electrical signal for adjusting a driving signal of the light-emitting element, so as to compensate the light-emitting element.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. In order to make the following description of the embodiments of the present disclosure clear and concise, the present disclosure omits detailed descriptions of known functions and known components.

Figures 1, 2A:
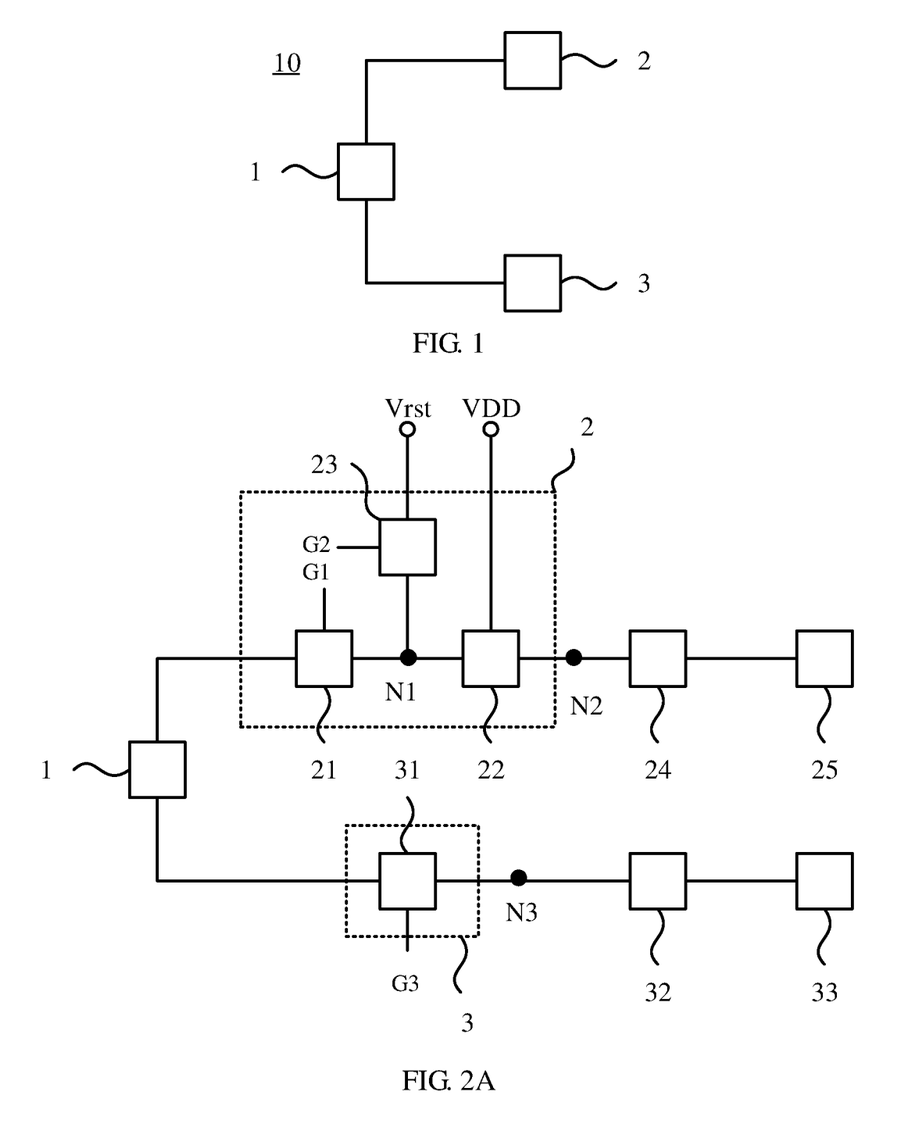
FIG. 1 is a schematic diagram of a compensation structure according to an embodiment of the present disclosure.
FIG. 2A is a schematic diagram of another compensation structure according to an embodiment of the present disclosure.

FIG. 1 is a schematic diagram of a compensation structure according to an embodiment of the present disclosure. The compensation structure according to the present embodiment may be applied to a display panel, such as a liquid crystal display panel and an organic light emitting diode display panel.

As shown in FIG. 1, the compensation structure 10 includes a photoelectric sensing circuit 1, a fingerprint identification circuit 2, and a compensation circuit 3. The photoelectric sensing circuit 1 is configured to generate a first electrical signal and a second electrical signal respectively according to a first optical signal and a second optical signal which are received by the photoelectric sensing circuit 1, and the first and second optical signals both come from a light-emitting element. The fingerprint identification circuit 2 is configured to be connected to the photoelectric sensing circuit to receive the first electrical signal, and utilize the first electrical signal for determining a fingerprint image. The compensation circuit 3 is configured to be connected to the photoelectric sensing circuit to receive the second electrical signal, and utilize the second electrical signal for optical compensation, such that the first electrical signal is adjusted. For example, the fingerprint identification circuit 2 may transmit the electrical signal to a processor for analysis to obtain the fingerprint image.

In one embodiment, the photoelectric sensing circuit 1 may generate an electrical signal according to a received optical signal, and may include, for example, a photosensitive element, such as a photodiode. For example, the received optical signal is converted into an electric charge for a first time period from a first moment, and the obtained quantity of electric charge is referred to as a first electrical signal; the received optical signal is converted into an electric charge for a second time period from a second moment, and the obtained quantity of electric charge is referred to as a second electrical signal. For example, the second moment is earlier than the first moment. For example, the first moment is after the second time period.

In one embodiment, the fingerprint identification circuit 2 may start receiving the first electrical signal when the first time period ends, such that a fingerprint image may be determined according to the first electrical signal. Due to different heights, a valley and a ridge of the fingerprint reflect the light emitted from the display panel differently. Therefore, the photoelectric sensing circuit at a position corresponding to the valley and the photoelectric sensing circuit at a position corresponding to the ridge receive different optical signals, such that different first electrical signals are generated, and the processor may further determine the fingerprint image according to the first electrical signals generated by the photoelectric sensing circuits at different positions.

For example, as shown in FIG. 2A, the fingerprint identification module 2 may transmit the first electrical signal to a first amplification circuit 24 and a first processing circuit 25. The first amplification circuit 24 amplifies the first electrical signal with a first gain, such that the first processing circuit determines the fingerprint image according to the amplified first electrical signal. For example, the first amplification circuit 14 and the first processing circuit 25 may be integrated in an external processor.

For example, the compensation circuit 3 is configured to utilize the second electrical signal for adjusting a driving signal of the light-emitting element, so as to allow the first electrical signal to be adjusted. For example, the compensation circuit 3 may transmit the second electrical signal to the processor, and the processor compares the second optical signal with a preset optical signal in terms of brightness, so as to obtain a compensation driving signal to enable the light-emitting element to have a luminance the same as the preset optical signal, and the processor adjusts the driving signal of the light-emitting element based on this, and implements the optical compensation, thereby adjusting the first electrical signal.

In the embodiment of the present disclosure, the processor may be implemented by a universal integrated circuit chip or an application-specific integrated circuit chip. For example, the integrated circuit chip may be provided on a motherboard, for example, a storage medium, a power circuit, or the like may be further provided on the motherboard. In addition, the processor may also be implemented by a circuit or software, hardware (circuit), firmware, or any combination thereof. In the embodiment of the present disclosure, the processor may include various computing structures, such as a complex instruction set computer (CISC) structure, a reduced instruction set computer (RISC) structure, or a structure for implementing a combination of various instruction sets. In some embodiments, the processor may also be a central processing unit, a microprocessor, such as an X86 processor, an ARM processor, or an image processor (GPU) or a tensor processor (TPU), or a digital Processor (DSP), or the like.

For example, the fingerprint identification circuit 2 is further configured to utilize the adjusted first electrical signal to adjust the gain of the first electrical signal and/or the first time period. For example, the fingerprint identification circuit 2 receives the adjusted first electrical signal and transmits the same to the external processor, and the external processor compares the first electrical signal (or the fingerprint identification signal obtained by integrating or amplifying the first electrical signal), for example, with a preset fingerprint signal, and if the fingerprint identification signal is too small, an integration time or amplification gain of the first electrical signal is controlled to be increased, which may improve the acquisition accuracy of the fingerprint identification signal. If the fingerprint identification signal is too large, the integration time or the amplification gain of the first electrical signal may be reduced, which may avoid an inaccurate acquired fingerprint signal due to a saturated acquisition quantity of a circuit. For example, the compensation structure may include a plurality of photoelectric sensing circuits 1, a plurality of fingerprint identification circuits 2 and a plurality of compensation circuits 3. For example, the display panel is a liquid crystal display panel, and the photoelectric sensing circuit may be located in a same layer as a pixel electrode of the display panel. For example, the display panel is an organic light emitting diode display panel, and the photoelectric sensing circuit may be located in a same layer as an electrode (e.g., anode or cathode) of the display panel close to a substrate.

In one embodiment, the compensation circuit 3 may start receiving the second electrical signal at the end of the second time period, and the processor may store a correspondence relationship (curve) between the driving signal of the light-emitting element and a display brightness of the display panel, or an association relationship between the driving signal and a preset signal in advance, wherein the preset signal may be a signal which should be generated by the photoelectric sensing circuit 1 when the light-emitting structure is driven by the driving signal. For example, the processor looks up the correspondence relationship between the driving signal and the display brightness, thereby obtaining the driving signal to be compensated to enable the light-emitting element to have a luminance the same as the preset optical signal, and adjusts the driving signal of the light-emitting element based on this, thereby compensating the light-emitting element.

For example, the processor may also determine the driving signal of the light-emitting structure of the display panel when the photoelectric sensing circuit 1 generates the second electrical signal, according to the second electrical signal, so as to inquire a target preset signal corresponding to the driving signal according to the association relationship, further comparing the target preset signal with the second electrical signal in terms of magnitude. If the second electrical signal is not equal to the target preset signal in terms of magnitude, it is shown that the second electrical signal generated by the photoelectric sensing circuit 1 is not accurate. The problem may be a problem of a pixel where the photoelectric sensing circuit 1 is located, or a problem of the photoelectric sensing circuit 1. Irrespective of which problem, the problem causing the inaccurate second electrical signal will also lead to inaccurate first electrical signals, which reduces the identified fingerprint accuracy.

The processor may also determine an offset according to the relationship between the second electrical signal and the target preset signal, adjust the first gain and/or the first time period according to the offset, and may compensate a deviation of the first electrical signal to ensure that the fingerprint image is accurately identified according to the first electrical signal.

For example, due to the problem of the light-emitting structure of the display panel, the luminance is too low, such that the second electrical signal is less than the target preset signal. Then, the first time period may be prolonged, such that the first electrical signal generated by the photoelectric sensing circuit 1 is increased. By increasing the first gain, the first amplification circuit is able to amplify the first electrical signal to be greater, thereby making the first electrical signal received by the first processing circuit greater, and compensating for the low luminance of the display panel and/or the small electrical signal generated by the photoelectric sensing circuit.

It should be noted that, for the organic light emitting diode display panel, the driving signal of the light-emitting structure may refer to a current signal or a data voltage signal applied on the organic light emitting diode; for the liquid crystal display panel, the driving signal of the light-emitting structure may include not only the current signal of the light emitting diode in a backlight module, but also the voltage signals of a pixel electrode and a common electrode in an array substrate.

For example, the end timing of the second time period may be earlier than the first moment, so as to ensure that the processor has determined the offset and adjusted the first gain and/or the first time period according to the offset before the first moment, such that the photoelectric sensing circuit may accumulate electric charges from the first moment for the adjusted first time period, and/or the fingerprint identification circuit may identify the fingerprint image with the adjusted first gain.

FIG. 2A is a schematic diagram of another compensation structure according to an embodiment of the present disclosure.

In one embodiment, as shown in FIG. 2A, the fingerprint identification circuit 2 includes a first switch circuit 21, a follower circuit 22, and a second switch circuit 23. The first switch circuit 21 is connected to the photoelectric sensing circuit 1 and is configured to output the first electrical signal to a first node N1 in response to a first control signal G1. The follower circuit 22 is connected to the first node N1 and is configured to output the voltage of the first node to the second node N2. The second switch circuit 23 is connected to a reset signal terminal Vrst and the first switch circuit 21 respectively, and is configured to write a reset voltage Vrst from the reset signal terminal to the first node N1 in response to the second control signal G2.

FIG. 2A also shows an amplification circuit and a processing circuit connected to the fingerprint identification circuit 2. As shown in FIG. 2A, an input terminal of the first amplification circuit 24 is connected with the second node N2 to receive and amplify the voltage of the second node N2. The first processing circuit 25 is connected to an output terminal of the first amplification circuit 24 and is configured to identify the fingerprint image according to a signal output from the amplification circuit 24.

For example, in a case where a first preset level is input to a first terminal of the first switch circuit 21, a second terminal and a third terminal of the first switch circuit 21 are electrically connected. When a second preset level is input to a first terminal of the follower circuit 22, the second terminal of the follower circuit 22 follows the first terminal. When the first preset level is input to a first terminal of the second switch circuit 23, a second terminal and a third terminal of the second switch circuit 23 are electrically connected.

In one embodiment, the second switch circuit 23 may be ON to reset. While the third switch 23 is ON, the first switch circuit 21 may also be ON, such that the reset voltage Vrst of the reset signal terminal Vrst may set the voltage of the photoelectric sensing circuit 1 to be Vrst by the switched-on first switch circuit 21 (hereinafter, simply referred to as the first ON of the first switch circuit 21), then the first switch 21 is OFF, and the third switch 23 is OFF, such that the voltage of the photoelectric sensing circuit 1 keeps an initial voltage Vrst.

Then, the photoelectric sensing circuit 1 may start accumulating the electric charges upon receiving the optical signal, such that the voltage changes from Vrst until the first switch circuit 21 is ON again after the first time period (hereinafter, referred to as the second ON of the first switch circuit 21), the electrical signal generated by the photoelectric sensing circuit 1 is denoted as the first electrical signal which is transmitted to the first terminal of the follower circuit 22 through the first switch circuit 21.

In a case where a second preset level (for example, the follower circuit 22 and the first switch circuit 21 are transistors of the same type, and the second preset level may be less than the first preset level) is input to the first terminal of the follower circuit 22, the follower circuit 22 may have a following effect. That is, the signal output from the second terminal of the follower circuit 22 is positively related to the first electrical signal transmitted to the first terminal of the follower circuit 22, and the first amplification circuit 24 may amplify the signal output from the second terminal of the follower circuit 22 with the first gain, so as to facilitate the calculation of the first processing circuit 25 subsequently.

In one embodiment, the time period from the first switch circuit 21 being OFF after the first ON until the second ON is the first time period during which the photoelectric sensing circuit 1 accumulates electric charges. The first time period for which the photoelectric sensing circuit generates the first electrical signal may be controlled by controlling the OFF time period. The longer the first time period, the longer the first time period during which the photoelectric sensing circuit 1 accumulates electric charges, the more the accumulated charges, and the larger the first electrical signal. Correspondingly, the shorter the first time period, the shorter the first time period during which the photoelectric sensing circuit 1 accumulates electric charges, the less the accumulated charges, and the smaller the first electrical signal. Therefore, by controlling the time period during which the first switch circuit 21 is OFF, the first time period may be controlled, thereby adjusting the first electrical signal generated by the photoelectric sensing circuit to compensate for the deviation of the luminance of the display panel.

It should be noted that different fingerprint identification circuits 2 may include different first processing circuits 25. The first processing circuits 25 of different fingerprint identification circuits 2 may also be the same, which may be set as needed For example, as shown in FIG. 2A, the compensation circuit 3 includes a third switch circuit 31 connected to the photoelectric sensing circuit 1 and configured to output the second electrical signal to a third node N3 in response to a third control signal G3.

FIG. 2A also shows an amplification circuit and a processing circuit connected to the fingerprint identification circuit 2. As shown in FIG. 2A, the input terminal of the second amplification circuit 32 is connected to the third node N3. The second processing circuit 33 is connected to the output terminal of the second amplification circuit 32, and is configured to determine the offset according to the relationship between an output value of the second amplification circuit 32 and the target preset signal.

For example, when the first preset level is input to the first terminal (control terminal) of the third switch circuit 31, the third switch circuit 31 is ON.

In one embodiment, the third switch circuit 31 may be ON once first (hereinafter, referred to as the first ON of the third switch circuit 32), such that the photoelectric sensing circuit 1 releases the accumulated electric charges with the conductive third switch circuit 31. Then, the third switch circuit 31 is OFF, such that the photoelectric sensing circuit 1 starts accumulating the electric charges for the second time period with the second gain, denoted as the second electrical signal, and then the third switch circuit 31 is ON again (hereinafter, referred to as the second ON of the third switch circuit), such that the second electrical signal enters the second amplification circuit 32 to be amplified by means of the third switch circuit 31, and the second processing circuit 33 determines the offset according to the relationship between the amplified second electrical signal and the target preset signal subsequently.

A size of the second electrical signal may be set by controlling the time of the first ON of the third switch circuit 31 and the second ON of the third switch circuit 31. For example, a relatively large interval exists between the OFF moment of the first ON of the third switch circuit 31 and the start moment of the second ON of the third switch circuit 31, and the second electrical signal is relatively large.

Figure 2B:
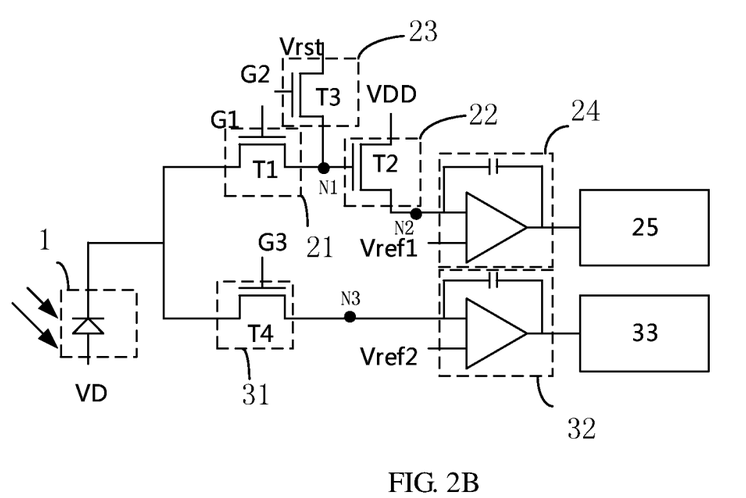
FIG. 2B is a schematic circuit diagram of a specific implementation example of the compensation structure shown in FIG. 2A.

FIG. 2B shows a schematic circuit diagram of a specific implementation example of the compensation structure in FIG. 2A. As shown in FIG. 2B, the first switch circuit includes a first transistor T1, a gate of the first transistor T1 is configured to receive the first control signal, and a first electrode and a second electrode of the first transistor are connected to the photoelectric sensing circuit and the first node respectively; the follower circuit includes a second transistor T2, a gate of the second transistor T2 is connected to the first node, the first electrode and the second electrode of the second transistor T2 are connected to a first power voltage terminal and the second node respectively; the second switch circuit includes a third transistor, a gate of the third transistor is configured to receive the second control signal, and the first and second electrodes of the third transistor T3 are connected to the reset voltage terminal and the first node N1 respectively.

The third switch circuit includes a fourth transistor T4, a gate of the fourth transistor T4 is configured to receive the third control signal, and the first and second electrodes of the fourth transistor are connected to the photoelectric sensing circuit and the third node N3 respectively.

Those skilled in the art understand that the transistors adopted in all embodiments of the present application may be thin film transistors or field effect transistors or other devices with the same characteristics. Due to symmetry, a source and a drain of the transistor adopted here may be interchanged. In the embodiment of the present disclosure, in order to distinguish the two poles of the transistor except the gate, one of the electrodes is referred to as the first electrode, and the other electrode is referred to as the second electrode. The first electrode may be a source or a drain. The second electrode may be a drain or a source.

It should be noted that in the description of each of the embodiments of the present disclosure, the first node N1, the second node N2, and the third node N3 do not represent actual components, but rather represent a meeting point of related circuit connections in a circuit diagram.

Figure 5:
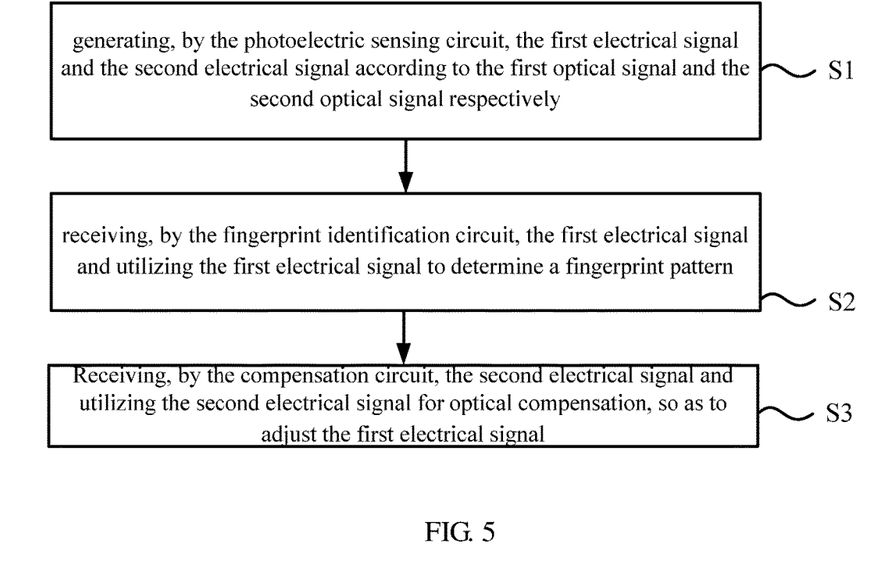
FIG. 5 is a schematic flowchart of a compensation method according to an embodiment of the present disclosure.

An embodiment of the present disclosure further provides a driving method of the above-mentioned compensation structure. FIG. 5 is a schematic flowchart of a driving method according to an embodiment of the present disclosure. As shown in FIG. 5, the driving method includes: step S1: generating, by the photoelectric sensing circuit, the first electrical signal and the second electrical signal according to the first optical signal and the second optical signal respectively; step S2: receiving, by the fingerprint identification circuit, the first electrical signal and utilizing the first electrical signal for determining a fingerprint image; and step S3: receiving, by the compensation circuit, the second electrical signal and utilizing the second electrical signal for optical compensation, so as to adjust the first electrical signal.

In one embodiment, the driving method may be executed based on the compensation structure according to any one of the above-mentioned embodiments, or other structures capable of executing the steps shown in FIG. 5.

Figure 6:
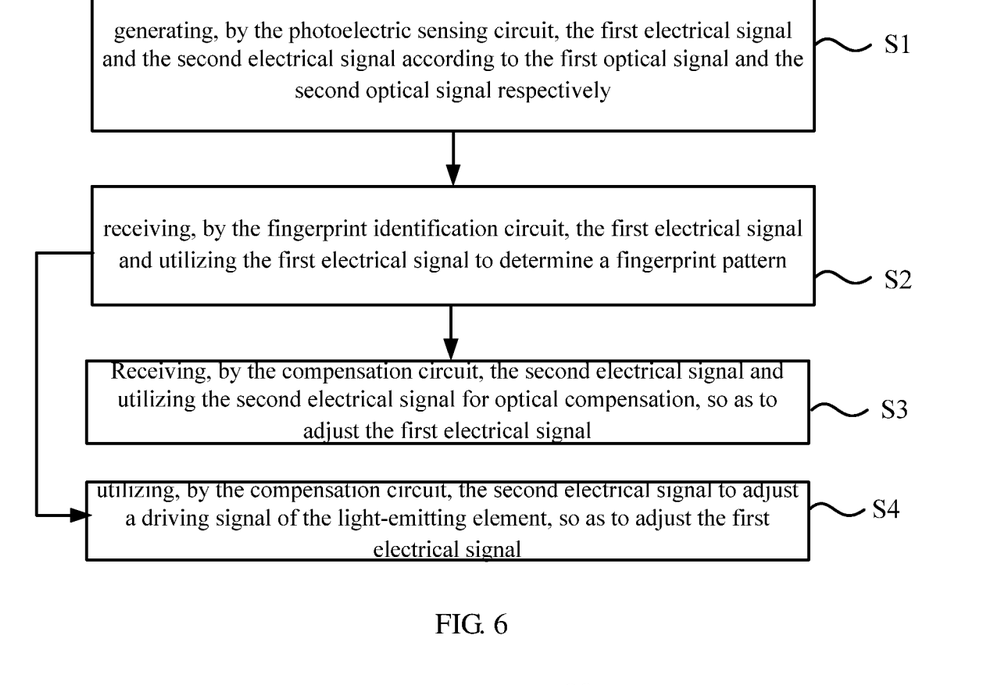
FIG. 6 is a schematic flowchart of another compensation method according to an embodiment of the present disclosure.

FIG. 6 is a schematic flowchart of another driving method according to an embodiment of the present disclosure. As shown in FIG. 6, the above-mentioned step S3 may specifically include step S4: utilizing, by the compensation circuit, the second electrical signal to adjust a driving signal of the light-emitting element, so as to compensate the light-emitting element.

Figure 3:
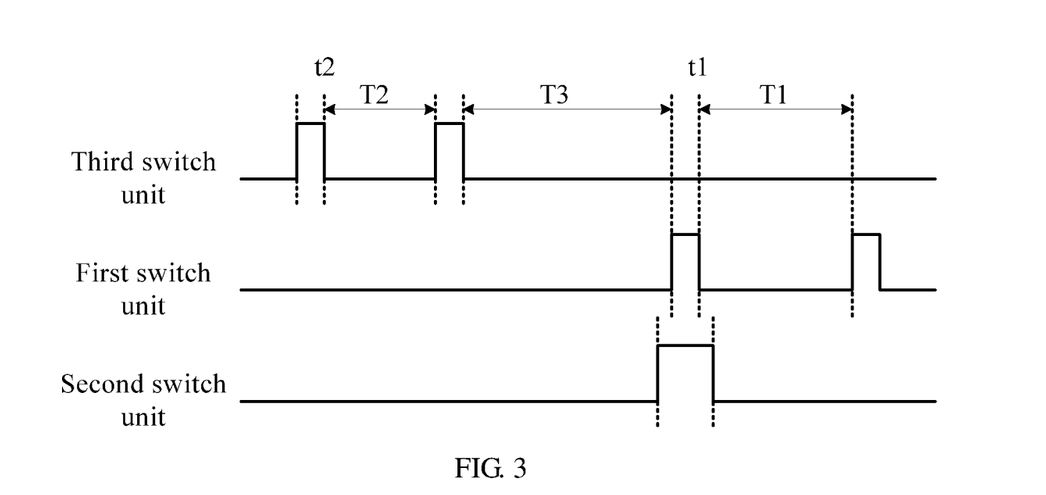
FIG. 3 is a schematic moment diagram of a driving method according to an embodiment of the present disclosure.

FIG. 3 is a schematic moment diagram of a driving method according to an embodiment of the present disclosure. The driving method according to the embodiment of the present disclosure will be exemplarily described below with reference to FIGS. 2A-2B and FIG. 3.

Based on the compensation structures shown in FIGS. 2A and 2B, for example, the first switch circuit 21, the follower circuit 22, the second switch circuit 23, and the third switch circuit 31 are all turned on at a high level. For example, the first transistor T1, the second transistor T2, the third transistor T3, and the fourth transistor T4 are all n-type transistors, but the embodiments of the present disclosure are not limited thereto.

First, the high-level third control signal G3 is input to the first terminal of the third switch circuit 31 (for example, the gate of the fourth transistor T4), the fourth transistor T4 is ON, the third switch circuit 31 is turned on, and the photoelectric sensing circuit 1 releases the accumulated electric charges through the turned-on third switch circuit 31, and then starts to input a low level to the second terminal of the third switch circuit 31 (for example, the first electrode of the fourth transistor T4) for the second time period T2, the third switch circuit 31 is OFF, the photoelectric sensing circuit 1 accumulates the electric charges for the second time period T2, and the accumulated electric charge is the second electrical signal.

Then, the high-level third control signal G3 is input to the first terminal of the third switch circuit 31 (a control terminal, such as the gate of the fourth transistor), the third switch circuit 31 is conductive, such that the second electrical signal enters the second amplification circuit 32 through the third switch circuit 31, and then the low level is input to the first terminal of the third switch circuit 31, and the third switch circuit 31 is turned off.

During the time period T3 from the OFF after the second ON of the third switch circuit 31 to the ON of the first switch circuit 21, the second amplification circuit 32 may amplify the second electrical signal, and the second processing circuit 33 determines the offset in accordance with the relationship between the amplified second electrical signal and the target preset signal, and performs the optical compensation according to the offset, thereby adjusting the first electrical signal.

Next, before the high-level first control signal G1 is input to the first terminal of the first switch circuit 21 (for example, the gate of the first transistor), the high-level second control signal G2 may be first input to the first terminal of the second switch circuit 23 (for example, the gate of the third transistor), such that the reset voltage Vrst of the reset signal terminal Vrst is transmitted to the third terminal (i.e., the first node N1) of the first switch circuit 21 through the conductive second switch circuit 23, and then the high-level first control signal G1 is input to the first terminal of the first switch circuit 21, such that the reset voltage Vrst may be transmitted to the photoelectric sensing circuit 1 through the first switch circuit 21, thereby resetting the photoelectric sensing circuit 1 and the first node N1. The low-level first control signal G1 is input to the first terminal of the first switch circuit 21 from the first moment t1, such that the first switch circuit 21 is turned off, and then the low-level second control signal G2 is input to the first terminal of the second switch circuit 23, such that the second switch circuit 23 is OFF. Before the first switch circuit 21 is ON, the second switch circuit 23 is ON, and after the first switch circuit 21 is OFF, the second switch circuit 23 is OFF, which may ensure that the voltage of the photoelectric sensing circuit is the reset voltage Vrst.

The low level keeps being input to the first terminal of the first switch circuit 21 for the first time period T1, and then the first switch circuit 21 is turned on when the high level is input to the first terminal of the first switch circuit 21. That is, the first switch circuit 21 keeps OFF for the first time period T1, and the photoelectric sensing circuit 1 accumulates the electric charges during the first time period T1.

Since the second processing circuit has performed the optical compensation according to the offset before the first switch circuit 21 is turned on, the signal received by the first processing circuit 25 has been the electrical signal corresponding to the optical signal from the light-emitting element subjected to the optical compensation when the first switch circuit 21 is ON for the second time, which may, based on this, solve the problem of inaccurate luminance of the display panel, thereby identifying the fingerprint image more accurately. For example, the optical compensation may be performed periodically, and the second and first time periods are within the same compensation period.

Figure 4:
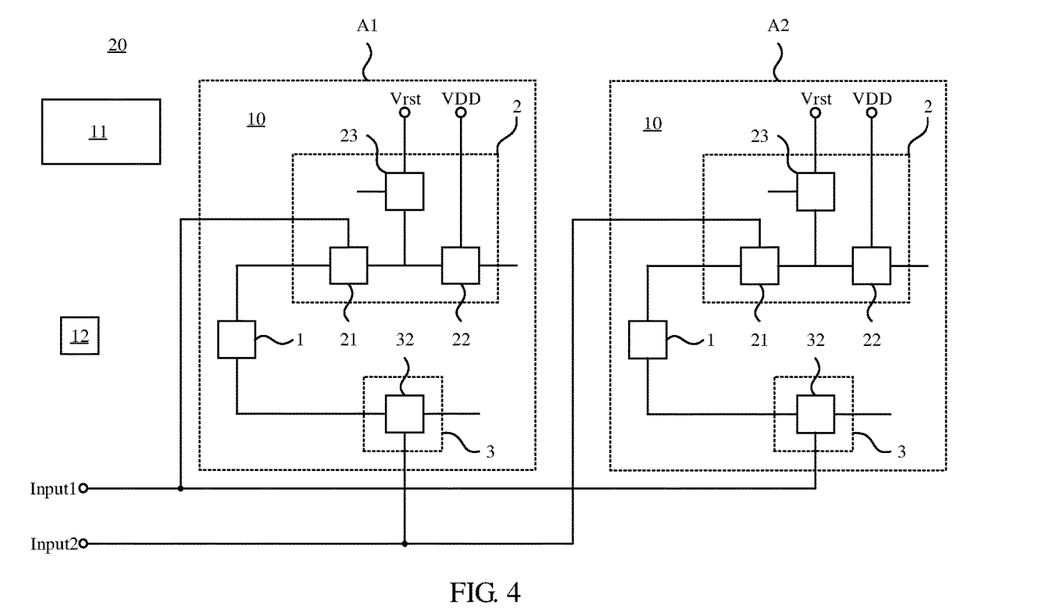
FIG. 4 is a schematic diagram of a display panel according to an embodiment of the present disclosure.

The embodiment of the present disclosure also provides a display panel including a light-emitting element and the compensation structure according to any one of the embodiments of the present disclosure. The photoelectric sensing circuit in the compensation structure is configured to receive light emitted by the light-emitting element and convert it into an electrical signal. For example, the compensation circuit in the compensation structure is further connected to the light-emitting element, and is configured to adjust the first optical signal of the light-emitting element according to the second electrical signal, so as to adjust the first electrical signal. FIG. 4 is a schematic diagram of a display panel according to an embodiment of the present disclosure. The display panel includes the above-mentioned compensation structure and the light-emitting element, and the first and second optical signals are both from the light-emitting element. For example, the display panel may include a plurality of compensation structures located in a plurality of regions respectively. For example, as shown in FIG. 4, the display panel 20 includes a light-emitting element 12, a first region A1 and a second region A2, and a first compensation structure provided in the first region A1 and a second compensation structure provided in the second region A2.

For example, the display panel 20 further includes a first control line P1 and a second control line P2. The first control line is connected to and controls the first switch circuit of the first compensation structure and the third switch circuit of the second compensation structure respectively, and the second control line is connected to and controls the third switch circuit of the first compensation structure and the first switch circuit of the second compensation structure respectively.

For example, the first control line P1 is connected to the control terminal of the first switch circuit of the first compensation structure (for example, the gate of the first transistor T1 in FIG. 2B) and the control terminal of the third switch circuit of the second compensation structure (for example, the gate of the fourth transistor T4 in FIG. 2B). The second control line P2 is connected to the control terminal of the first switch circuit of the second compensation structure (for example, the gate of the first transistor T1 in FIG. 2B) and the control terminal of the third switch circuit of the first compensation structure (for example, the gate of the fourth transistor T4 in FIG. 2B).

For example, the display panel 20 further includes a first switch signal terminal Input1 connected with the first control line P1 and a second switch signal terminal Input2 connected with the second control line P2. The first switch signal terminal Input1 is connected to the first terminal of the first switch circuit 21 in the first region A1 and the first terminal of the third switch circuit 31 in the second region A2 of the plurality of regions. The second switch signal terminal Input2 is connected to the first terminal of the third switch circuit 31 in the first region A1 and the first terminal of the first switch circuit 21 in the second region A2.

For example, the first and second switch signal terminals Input1 and Input2 are configured to output the signal at the first preset level.

In one embodiment, the first region A1 may be a continuous region or include a plurality of discrete regions, and the second region A2 may be a continuous region or include a plurality of discrete regions. The first region A1 and the second region 2 may not have overlapped portions.

By connecting the first switch signal terminal Input1 to the first terminal of the first switch circuit 21 in the first region A1 and the first terminal of the third switch circuit 31 in the second region A2, and by connecting the second switch signal terminal Input2 to the first terminal of the first switch circuit 21 in the second region A2 and the first terminal of the third switch circuit 31 in the first region A1, the first switch circuit 21 and the third switch circuit 31 in different regions may be controlled to be On and OFF by one switch signal terminal, such that with respect to the first switch circuits 21 and the third switch circuits 31 in two regions, only two switch signal terminals may control the switch circuit to be ON and OFF, without providing the switch signal terminal for each of the first and third switch circuits respectively, thereby dispensing with the switch signal terminal and wirings, which facilitates simplification of the wirings in the display panel.

It should be noted that the first and second switch signal terminals Input1 and Input2 may be controlled by MUX respectively to ensure that Input1 and Input2 may output the first preset level at the appropriate timing.

For example, the compensation circuit is further connected to a light-emitting circuit of the display panel, and is configured to adjust the luminance of the light-emitting circuit where the photoelectric sensing circuit is located according to the offset.

In one embodiment, in the case where there is an offset between the second electrical signal and the target preset signal, it may be determined that a deviation exists in the luminance of the light-emitting circuit corresponding to the position where the photoelectric sensing circuit is located in the display panel.

For example, if the second electrical signal is greater than the target preset signal, it indicates that the luminance is relatively great, which in this case, on the one hand, leads to a relatively high brightness of the light-emitting circuit, and on the other hand, may result in oversaturation of the photoelectric sensing circuit (i.e., more light rays received by the photoelectric sensing circuit, the generated electrical signal not increasing with an increase in an amount of light.) Therefore, on the one hand, the first gain and/or the first time period of the photoelectric sensing circuit may be adjusted to guarantee the accuracy of fingerprint identification. On the other hand, the luminance of the light-emitting circuit may be adjusted to guarantee the accuracy of the display brightness and improve the display effect.

For example, the display panel further includes a pressure sensing circuit 11 for sensing pressure on the display panel.

For example, the first switch signal terminal Input1 outputs a signal to turn on the first switch circuit (for example, the first transistor) in the first region and the third switch circuit (for example, the fourth transistor) in the second region when the pressure sensing circuit senses that the first region is under pressure but the second region is not under pressure; the second switch signal terminal Input2 outputs a signal to turn on the third switch circuit (for example, the fourth transistor) in the first region and the first switch circuit (for example, the first transistor) in the second region when the pressure sensing circuit senses that the second region is under pressure but the first region is not under pressure.

In one embodiment, the pressure sensing circuit may determine which region of the display panel is under pressure, and the region under pressure is usually an region blocked by the user, such as an region where a touch operation is performed or an region where the fingerprint identification is performed. The pressure sensing circuit may be connected to the processor of the display panel, and the processor controls the first and second switch signal terminals Input1 and Input2 in accordance with the region where the pressure sensing circuit senses the pressure.

For example, when the pressure sensing circuit senses that the first region A1 is under pressure, a user may press his or her finger on the first region A1 to control the first switch signal terminal Input1 to output the signal at the first preset level (for example, according to the embodiment shown in FIG. 3, the high-level signal is output to the first terminal of the first switch circuit 21 twice), such that the first switch circuit 21 in the first region A1 is turned on to perform the fingerprint identification.

At the same time, for the second region A2 that is not under pressure, the first switch signal terminal Input1 may output the signal at the first preset level to the first terminal of the third switch circuit 32 in the second region A2 (for example, according to the embodiment shown in FIG. 3, the high-level signal is output to the first terminal of the third switch circuit 22 twice), such that the third switch circuit 32 in the second region A2 is turned on to determine the offset. After the offset is determined, the luminance of the light-emitting circuit may be adjusted according to the offset to ensure the accuracy of the display brightness and improve the display effect.

As such, the fingerprint identification may be performed on the first region A1 covered by the user, without adjusting the luminance. Since the first region A1 is covered by the user, the viewing experience of the user is not affected, and the power consumption may be reduced. For the second region A2 not covered by the user, the luminance may be adjusted, without the fingerprint identification, thereby reducing the power consumption while improving the viewing experience of the user.

For example, the second processing circuit adjusts the luminance of the light-emitting circuit at the position where the photoelectric sensing circuit is located according to the offset within the time of a frame, and adjusts the first gain and/or the first time period according to the offset; or the second processing circuit adjusts the luminance of the light-emitting circuit at the position where the photoelectric sensing circuit is located according to the offset within the time of different frames, and adjusts the first gain and/or the first time period according to the offset.

In one embodiment, the second processing circuit may adjust the luminance and the first gain and/or the first time period within the time of different frames. In this case, for example, in the embodiment shown in FIG. 3, before T2, the third switch circuit is ON twice within the time of one frame, and after T2, the first switch circuit is ON twice within the time of another frame. How to adjust T3 and the first grain of the photoelectric sensing circuit during T3 may be determined during T2.

Figure 7:
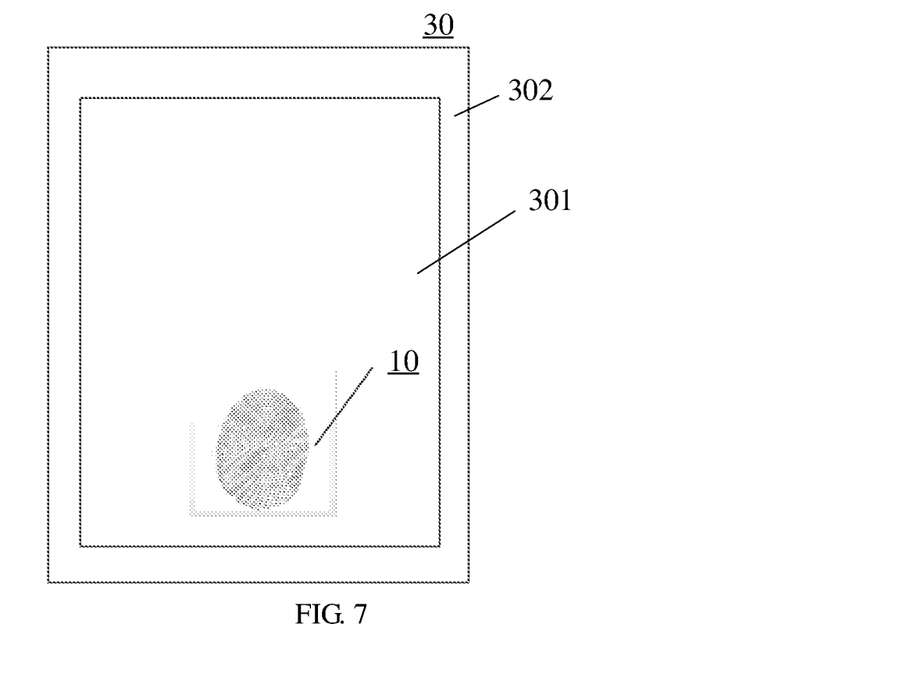
FIG. 7 is a schematic diagram of a display device according to an embodiment of the present disclosure.

In one embodiment, the second processing circuit may adjust the luminance and the first gain and/or the first time period within the time of one frame. In this case, for example, in the embodiment shown in FIG. 3, the third switch circuit is ON twice before T2 and the first switch circuit is ON twice after T2 within the time of the same one frame. T3 and the first gain during T2 may be adjusted according to how to adjust T3 and the first grain of the photoelectric sensing circuit during T2 of the previous frame. An embodiment of the present disclosure also provides a display device. As shown in FIG. 7, the display device 30 includes the display panel or the compensation structure 10 according to the above-mentioned embodiment, and the above-mentioned processing circuit (processor). The processing circuit may be integrated on the circuit board and bound with the display panel 20 by for example, a flexible circuit board (FPC). For example, the display device 30 includes a display region 301 and a non-display region 302. The display region 301 is provided with a fingerprint identification region, and the compensation structure 10 is provided in the fingerprint identification region.

It should be noted that the display device in the present embodiment may be any product or component having a display function, such as electronic paper, mobile phone, tablet computer, television, notebook computer, digital photo frame, and navigator.

In the embodiment of the present disclosure, the terms "first", "second" are merely for illustrative purposes, and not intended to indicate or imply relative importance. The term "plurality" refers to two or more, unless otherwise defined explicitly.

What have been described above are only specific implementations of the present disclosure, the protection scope of the present disclosure is not limited thereto, and the protection scope of the present disclosure should be based on the protection scope of the claims.

What is claimed is:
1. A display panel, comprising:
a first compensation structure and a second compensation structure,
a light-emitting element, and
a first control line and a second control line,
wherein each of the first compensation structure and the second compensation structure comprises:
a photoelectric sensing circuit, configured to generate a first electrical signal and a second electrical signal respectively according to a first optical signal and a second optical signal which have been received by the photoelectric sensing circuit, the first and second optical signals both from the light-emitting element;
a fingerprint identification circuit, configured to be connected to the photoelectric sensing circuit to receive the first electrical signal, and to utilize the first electrical signal for determining a fingerprint image; and a compensation circuit, configured to be connected to the photoelectric sensing circuit to receive the second electrical signal, and to utilize the second electrical signal for optical compensation such that the first electrical signal is adjusted, wherein the fingerprint identification circuit comprises:
a first switch circuit, connected to the photoelectric sensing circuit and configured to output the first electrical signal to a first node in response to a first control signal;
a follower circuit, connected to the first node and configured to output a voltage of the first node to the second node; and
a second switch circuit, respectively connected to a reset signal terminal and the first switch circuit, and configured to write a reset voltage from the reset signal terminal to the first node in response to a second control signal;
the compensation circuit comprises a third switch circuit which is connected to the photoelectric sensing circuit and configured to output the second electrical signal to a third node in response to a third control signal;
the first control line is connected to and control the first switch circuit of the first compensation structure and the third switch circuit of the second compensation structure respectively;
the second control line is connected to and control the third switch circuit of the first compensation structure and the first switch circuit of the second compensation structure respectively.

2. The display panel according to claim 1, wherein the compensation circuit is configured to utilize the second electrical signal for adjusting a driving signal of the light-emitting element, so that the first electrical signal is adjusted.

3. The display panel according to claim 1, wherein the first electrical signal is generated based on the first optical signal and a first time period, and the fingerprint identification circuit is further configured to utilize the adjusted first electrical signal for adjusting a gain of the first electrical signal and/or the first time period.

4. The display panel according to claim 1, wherein
the first switch circuit comprises a first transistor, a gate electrode of the first transistor is configured to receive the first control signal, and a first electrode and a second electrode of the first transistor are connected to the photoelectric sensing circuit and the first node respectively;
the follower circuit comprises a second transistor, a gate electrode of the second transistor is connected to the first node, a first electrode and a second electrode of the second transistor are connected to a first power voltage terminal and the second node respectively;
the second switch circuit comprises a third transistor, a gate electrode of the third transistor is configured to receive the second control signal, and a first electrode and a second electrode of the third transistor are connected to the reset voltage terminal and the first node respectively.

5. The display panel according to claim 1, wherein
the third switch circuit comprises a fourth transistor, a gate of the fourth transistor is configured to receive the third control signal, and a first electrode and a second electrode of the fourth transistor are connected to the photoelectric sensing circuit and the third node respectively.

6. The display panel according to claim 1, wherein the first electrical signal is generated based on the first optical signal and a first time period, and the fingerprint identification circuit is further configured to utilize the adjusted first electrical signal for adjusting a gain of the first electrical signal and/or the first time period;

the compensation circuit is configured to adjust a luminance of the light-emitting element according to the second optical signal, and to adjust a first gain of the first electrical signal and/or the first time period according to the second electrical signal within time of one frame; or the compensation circuit is configured to adjust the luminance of the light-emitting element according to the second optical signal, and to adjust the first gain of the first electrical signal and/or the first time period according to the second electrical signal within time of different frames.

7. A display device, comprising the display panel according to claim 1.

8. A driving method of the display panel according to claim 1, comprising:
generating, by the photoelectric sensing circuit, the first electrical signal and the second electrical signal according to the first optical signal and the second optical signal respectively;
receiving, by the fingerprint identification circuit, the first electrical signal and utilizing the first electrical signal for determining a fingerprint image; and
receiving, by the compensation circuit, the second electrical signal and utilizing the second electrical signal for optical compensation, so as to adjust the first electrical signal.

9. The driving method according to claim 8, wherein
the receiving, by the compensation circuit, the second electrical signal and utilizing the second electrical signal for optical compensation, so as to adjust the first electrical signal comprises:
utilizing, by the compensation circuit, the second electrical signal for adjusting a driving signal of the light-emitting element, so as to compensate the light-emitting element.

10. A display panel, comprising:
a first compensation structure located in a first region and a second compensation structure located in a second region,
a light-emitting element, and
a first switch signal terminal and a second switch signal terminal,
wherein each of the first compensation structure and the second compensation structure comprises:
a photoelectric sensing circuit, configured to generate a first electrical signal and a second electrical signal respectively according to a first optical signal and a second optical signal which have been received by the photoelectric sensing circuit, the first and second optical signals both from the light-emitting element;
a fingerprint identification circuit, configured to be connected to the photoelectric sensing circuit to receive the first electrical signal, and to utilize the first electrical signal for determining a fingerprint image; and
a compensation circuit, configured to be connected to the photoelectric sensing circuit to receive the second electrical signal, and to utilize the second electrical signal for optical compensation such that the first electrical signal is adjusted,
wherein the fingerprint identification circuit comprises:
a first switch circuit, connected to the photoelectric sensing circuit and configured to output the first electrical signal to a first node in response to a first control signal;
a follower circuit, connected to the first node and configured to output a voltage of the first node to the second node; and
a second switch circuit, respectively connected to a reset signal terminal and the first switch circuit, and configured to write a reset voltage from the reset signal terminal to the first node in response to a second control signal;
the first switch circuit comprises a first transistor, a gate electrode of the first transistor is configured to receive the first control signal, and a first electrode and a second electrode of the first transistor are connected to the photoelectric sensing circuit and the first node respectively;
the follower circuit comprises a second transistor, a gate electrode of the second transistor is connected to the first node, a first electrode and a second electrode of the second transistor are connected to a first power voltage terminal and the second node respectively;
the second switch circuit comprises a third transistor, a gate electrode of the third transistor is configured to receive the second control signal, and a first electrode and a second electrode of the third transistor are connected to the reset voltage terminal and the first node respectively;
the compensation circuit comprises a third switch circuit which is connected to the photoelectric sensing circuit and configured to output the second electrical signal to a third node in response to a third control signal;
the third switch circuit comprises a fourth transistor, a gate of the fourth transistor is configured to receive the third control signal, and a first electrode and a second electrode of the fourth transistor are connected to the photoelectric sensing circuit and the third node respectively;
the first switch signal terminal is connected to a gate electrode of the first transistor in the first region and a gate electrode of the fourth transistor in the second region;
the second switch signal terminal is connected to a gate electrode of the fourth transistor in the first region and a gate electrode of the first transistor in the second region.

11. The display panel according to claim 10, further comprising a pressure sensing circuit,
wherein the first switch signal terminal is configured to output a first signal to turn on the first transistor in the first region and the fourth transistor in the second region in a case where the pressure sensing circuit senses that the first region is under pressure but the second region is not under pressure;
the second switch signal terminal is configured to output a second signal to turn on the fourth transistor in the first region and the first transistor in the second region in a case where the pressure sensing circuit senses that the second region is under pressure but the first region is not under pressure.

* * * * *